Aug. 7, 1951   W. G. SCOTT   2,563,623
LEACHING COPPER ORES
Filed June 10, 1948   2 Sheets-Sheet 1
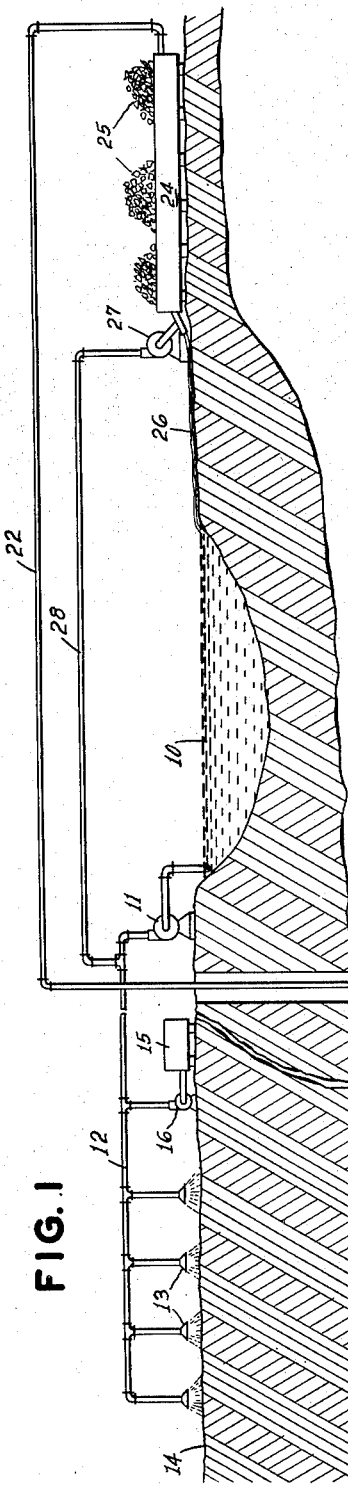
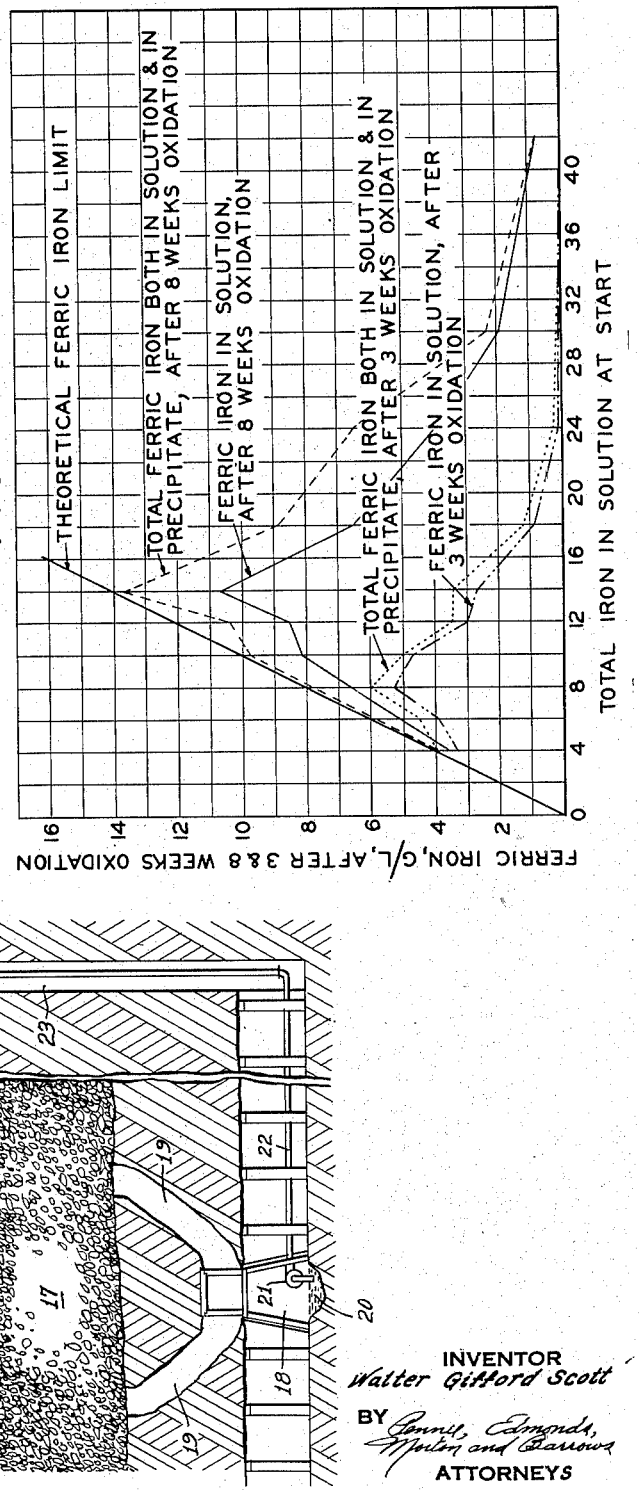
INVENTOR
Walter Gifford Scott
BY
ATTORNEYS Aug. 7, 1951  W. G. SCOTT  2,563,623
LEACHING COPPER ORES
Filed June 10, 1948  2 Sheets-Sheet 2
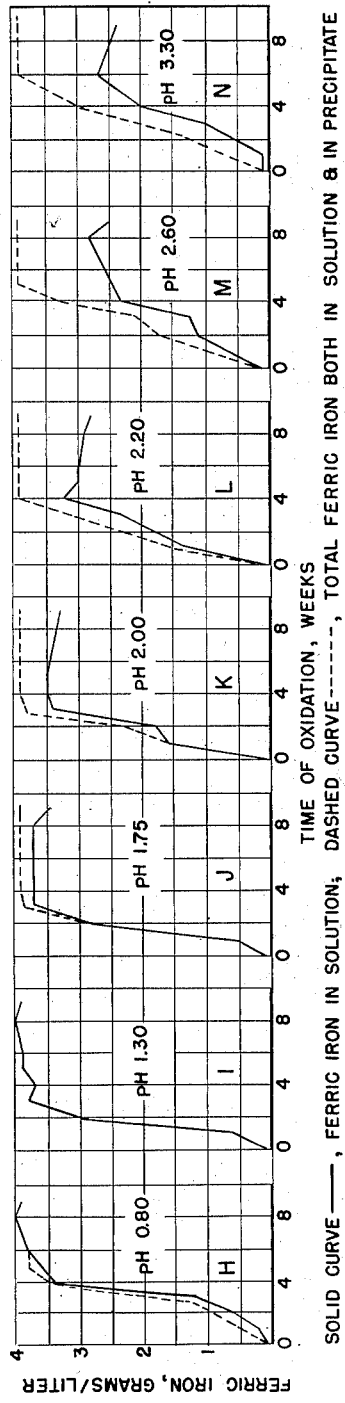
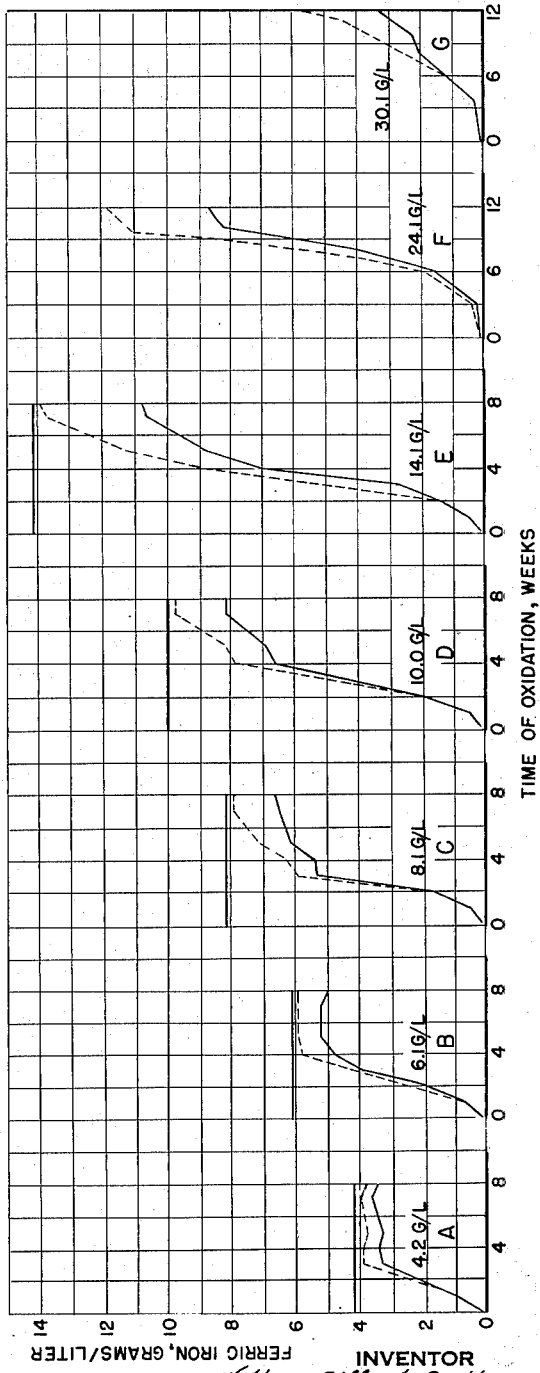
INVENTOR
Walter Gifford Scott
BY
ATTORNEYS Patented Aug. 7, 1951

2,563,623

UNITED STATES PATENT OFFICE 2,563,623

LEACHING COPPER ORES

Walter Gifford Scott, Inspiration, Ariz., assignor to Inspiration Consolidated Copper Company, a corporation of Maine Application June 10, 1948, Serial No. 32,150

11 Claims. (Cl. 75—104)

This invention relates to leaching sulphidic copper ores, and is directed particularly to the provision of an improved method for leaching such ores in place. Such leaching involves passing a dilute aqueous solution of sulphuric acid and ferric sulphate through the ore. The invention contemplates controlling the concentration of iron in the leach solution, and its pH, within limits found to be critical (1) for avoiding plugging of solution channels in the ore and (2) to enable ferrous iron to be reoxidized economically by the air to the ferric condition.

Leaching of copper ores "in place" is a procedure for recovering copper from ores containing it in worthwhile amounts, but that are of too low grade to be mined at a profit (such, under present economic conditions, as ores containing about ½% copper). Leaching in place is not in itself a new concept. It has been employed with some success in a number of places. It has been successful, however, only when the ore being leached contains substantial amounts of iron pyrites, $FeS_2$. In such cases water, in combination with dissolved oxygen from the air, is a satisfactory leaching agent. Iron pyrites, in the presence of water and oxygen from the air, oxidizes quite readily to ferrous sulphate and sulphuric acid,

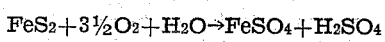
$$FeS_2 + 3\tfrac{1}{2}O_2 + H_2O \rightarrow FeSO_4 + H_2SO_4$$

and the ferrous sulphate then becomes oxidized to the ferric form,

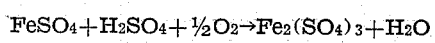
$$FeSO_4 + H_2SO_4 + \tfrac{1}{2}O_2 \rightarrow Fe_2(SO_4)_3 + H_2O$$

The sulphuric acid and ferric sulphate thus formed are effective reagents for dissolving both oxidized and sulphide copper minerals.

On account of the quite rapid progress of the first of the foregoing reactions, pyritic copper ores are commonly known in the leaching art as "acid-making" ores. The production within the orebody itself of sufficient sulphuric acid to prevent basic ferric sulphate from precipitating in the solution channels and gradually plugging them up is an important factor contributing to the success of leaching pyritic copper ores in place. Further, since the ferric sulphate itself is made within the orebody, there is no problem involving oxidation of a ferrous sulphate solution to the ferric form before it is delivered to the orebody.

In addition to the pyritic orebodies that have been leached in place successfully, there are a considerable number of known sulphidic but non-pyritic copper orebodies of substantial extent containing too little copper to be mined at a profit, but which are well-suited to leaching in place. For example, in districts where low-grade porphyry copper ores are found, there are often large marginal portions of the orebody which become broken up in the course of mining the richer zones, but which do not contain enough copper to make extraction of the broken marginal material worthwhile. Such ore is well adapted to leaching in place, but cannot be leached by the method that has been successful on pyritic ores. The lack of pyrites in the ore makes it impossible to leach with water alone, as no sulphuric acid or ferric sulphate is formed in the orebody to dissolve the copper. Leaching in place with sulphuric acid alone results in extracting only such copper as is present in oxidized minerals—it does not extract copper from sulphide minerals. If ferric sulphate is added to the leach solution to dissolve the sulphidic copper minerals, two problems present themselves that have not heretofore been solved: (1) the problem of preventing the ferric sulphate from precipitating as a basic sulphate in the solution channels within the orebody and gradually plugging them, as the sulphuric acid initially added to the solution is consumed during leaching with consequent decrease in the acidity of the solution, and (2) the problem of economically providing an adequate supply of ferric sulphate in the leach solution.

The present invention provides an effective solution to both of these problems. I have discovered that if the leach solution delivered to the ore contains less than 10 grams per liter of iron, and preferably not more than 8 grams per liter, and if sufficient sulphuric acid is initially present so that the solution after draining through the ore has a pH not greater than about 2, no plugging of the solution channels in the orebody occurs in consequence of the precipitation of basic ferric sulphate. I have further discovered that in a solution containing sulphuric acid, ferrous sulphate (to which form the ferric sulphate is reduced in leaching and in which form iron enters solution during recovery of the copper by cementation) can be oxidized to the ferric form and used again in leaching by simple exposure of the solution to the oxygen of the air, provided the concentration of iron in the air-exposed solution is less than 25 grams per liter, and preferably less than 15 grams per liter; and that if the pH of the solution thus exposed to the air is not less than about 2, excess iron therein precipitates as a basic ferric sulphate, reducing the iron concentration to an optimum value (less than 10 grams per liter) for leaching.

Based on these discoveries, my invention provides for leaching sulphidic copper ore in place by delivering a dilute aqueous solution of sulphuric acid and ferric sulphate to the ore, and collecting the solution after it has passed through the ore, characterized in that the total amount of iron present in the solution delivered to the ore is less than 10 grams per liter, and the amount of sulphuric acid therein is such that the pH of the solution when it is collected after passing through the ore is not greater than about 2. Further, after the copper has been extracted from the leach solution, the invention provides for making the solution available for reuse, by oxidizing its ferrous iron content to the ferric form and precipitating excess iron therefrom. Such oxidation is effected in accordance with the invention by introducing the solution into a body thereof that is exposed for at least several days to the oxygen of the air, the total amount of iron in the solution being limited to less than 25 grams per liter (and preferably to less than 15 grams per liter) at the time of its introduction into said body, and the amount of sulphuric acid in the solution then being such that its pH is not less than about 2. Thereby the ferrous iron becomes oxidized and excess iron precipitates as basic ferric sulphate.

The invention is described in somewhat greater detail below in conjunction with the acompanying drawings, in which Fig. 1 shows schematically a preferred embodiment of the invention for leaching sulphidic but non-pyritic copper ore in place;

Fig. 2 is a series of charts (A to G) showing how variations in the concentration of iron in a solution initially containing iron as ferrous sulphate affect oxidation thereof upon exposure to air;

Fig. 3 is a chart showing how the efficiency of the oxidation of a ferrous sulphate solution exposed to the air varies with the total amount of iron in solution; and Fig. 4 is a series of charts (H to N) showing the effect of pH variations on the way in which ferrous iron is oxidized and precipitated upon exposure of a ferrous sulphate solution to air.

Referring first to Fig. 1, the method of the invention involves delivering ferric sulphate solution from a storage pond 10 by a pump 11 through a pipe 12 and sprays 13 to the surface 14 of the ground overlying the ore in place to be leached. The concentration of iron in this solution is less than 10 grams per liter and preferably is less than 8 grams per liter. Sulphuric acid from a storage vessel 15 is introduced into the ferric sulphate solution by a pump 16 prior to spraying the solution on the ground over the orebody.

The orebody 17 to be leached is shown diagrammatically as having been broken and opened to the penetration of leach solution by mining operations previously conducted from drifts 18 and raises 19. The solution of ferric sulphate and sulphuric acid seeps down through the column of broken ore 17 into the raises and drifts, collecting ultimately in one or more sumps 20 in these mine workings. In its passage through the ore, oxidized copper minerals are dissolved by the sulphuric acid present in the solution, and sulphide minerals, especially chalcocite, are dissolved by the ferric sulphate (the ferric sulphate thereby becoming reduced to ferrous sulphate).

The amount of sulphuric acid added from the container 15 prior to delivery of the solution through the sprays 13 is sufficient so that after the solution has percolated down through the ore and has collected in the sump 20, its pH is not significantly greater than 2. If less than this amount of sulphuric acid is used, or if the iron in solution exceeds the limiting value of 10 grams per liter at the time of its delivery through the nozzles 13, basic ferric sulphate precipitates in amounts sufficient to plug up solution channels through the broken ore. Such an occurrence may lead to the loss of the orebody for leaching in place, by making it impossible or uneconomically difficult for the leach solution to penetrate through it.

The copper-laden solution collecting in the sump 20 is delivered by a pump 21 through a pipe 22 extending up through a shaft 23 to one or more cementation launders 24 containing scrap iron 25. Here the copper sulphate in the solution is precipitated as metallic cement copper, which can be treated by conventional methods to produce metallic copper in marketable form. Precipitation of the copper is accompanied by dissolution of an equivalent amount of iron as ferrous sulphate. Some further quantity of ferrous sulphate also is introduced into the solution as a result of direct chemical attack on the scrap iron by the residual sulphuric acid. The ferrous sulphate thus entering solution during precipitation of the copper is in addition to the iron sulphate (most of which was reduced to the ferrous form during leaching) that was originally present. In consequence, copper-free effluent solution withdrawn from the precipitation launder 24 contains most of the iron in solution in the ferrous form, and contains more iron in solution than is desirable if the solution is to be reused in the leaching cycle. The ferrous iron is oxidized and the excess iron is precipitated by delivering the effluent solution through a stream or other conduit 26 to the main body of solution in the pond 10. The pond should have a fairly large surface-to-volume ratio (i. e. it should be rather shallow and of broad surface extent) to present as great an area of contact to the oxygen of the air as is reasonably possible; for it is by exposure of the solution in the pond to the oxygen of the air that oxidation and precipitation are caused to occur.

It is necessary that the solution as it is withdrawn from the cementation launder 24 contains less than 25 grams per liter of iron, and preferably less than 15 grams per liter. If it contains more than 25 grams per liter, virtually none of the ferrous iron will be oxidized in any reasonable period of time, and if it contains more than 15 grams per liter, the extent of such oxidation will be decidedly incomplete. Furthermore, the effluent solution should have a pH not less than about 2. Otherwise the undesirable excess of iron, above the maximum of 10 grams per liter permissible for leaching, will not be precipitated. If, however, the iron concentration and the pH of the solution are kept within the limits stated, mere exposure of the solution to the air in the pond 10 for a period of several weeks is sufficient to effect oxidation of the ferrous iron to the ferric form, and to bring about precipitation of excess iron in the form of basic ferric sulphate. The pond should be large enough to contain at least several weeks supply of leach solution in order to give ample time for oxidation and precipitation to take place.

If the solution acidified with sulphuric acid and delivered to the ore through the sprays 13 contains some ferrous sulphate, it will be at least in part oxidized to the ferric form by reaction with dissolved oxygen from the air as it seeps down through the porous ground. Advantage can be taken of this fact to minimize the volume of solution that must be held in the pond 10 for oxidation, by diverting a portion of the effluent from the cementation launder 24 by means of a pump 27 through a pond by-pass pipe 28 directly to the pipe 12 through which solution is delivered to the ore. The ferrous sulphate in this portion of the effluent then will be largely oxidized in trickling down through the ground, rather than in the pond, after the sulphuric acid has been added. Provided the total iron concentration is kept below the preferred limit given above (8 grams per liter), this oxidation takes place quite rapidly; and after the orebody has been warmed somewhat by the chemical reaction involved in dissolution of the oxidized minerals by the sulphuric acid, the rate of the oxidation reaction increases considerably.

The critical nature of proper control over iron concentration and pH, as these factors affect oxidation of ferrous iron to the ferric form upon exposure to the air, and as they affect precipitation of excess ferric iron, is evident from Figs. 2 to 4. Reference first is made to Fig. 2, which is a series of charts (A to G) showing how variations in the total iron concentration in an aqueous solution affects the way in which oxidation of ferrous iron to the ferric form takes place (both as to the rate of such oxidation and the extent to which it occurs), and how it further affects the extent to which iron that has been oxidized to the ferric form is precipitated as basic ferric sulphate. Fig. 2 is based on a series of tests made on aqueous solutions initially containing iron only in the form of ferrous sulphate in the various amounts indicated, and which were each exposed quietly to the air for a number of weeks to oxidize the ferrous sulphate to ferric sulphate. In each of these tests the pH of the solution was adjusted at the start to 2.0 by the addition of the proper amount of sulphuric acid. The solid curve in each case shows the amount of ferric iron in solution at any given time after the start of the test. The dashed curve shows the total amount of ferric iron present both in solution and in the red precipitate of basic ferric sulphate which formed after the test had been under way for a while. The solid straight horizontal line at the top of each of charts A to E indicates the total amount of iron present, both ferrous and ferric, and is drawn on the basis of the amount of iron present in the solution at the start of the test. It marks the maximum possible limit of ferric iron that could be formed by oxidation. This straight horizontal line is omitted from charts F and G because the positions it should occupy are outside the range of the drawing. The vertical distance between the solid curve and the dashed curve on any given time ordinate indicates the amount in grams per liter of ferric iron that has at that time become precipitated as basic ferric sulphate. The vertical distance between the dashed curve and the horizontal straight line at the top of charts A to E on any given time ordinate indicates the amount of ferrous iron then still unoxidized.

Charts A to E show that in a period of 8 weeks exposure of the solution to air, any amount of iron up to about 15 grams per liter becomes almost completely oxidized to the ferric form, part being precipitated as basic ferric sulphate and part remaining in solution. As shown in charts F and G, however, higher concentrations of iron result in only incomplete oxidation to the ferric form, even after a period of 12 weeks exposure to air. (Charts F and G are based on tests in which the ratio of surface-to-volume of the solution during oxidation was approximately half as great as in the tests on which charts A to E are based. These two tests, however, were conducted for a longer period of time to compensate for this difference, and were carried out long enough to determine about the maximum extent to which the iron would oxidize.) Other tests have shown that at still higher iron concentrations virtually none of the iron becomes oxidized. For example, with a solution containing about 43 grams per liter of iron, initially as ferrous sulphate, at a pH of 2, a total amount of less than 1 gram per liter of ferric iron was formed after 12 weeks exposure of the solution to air, and the curve drawn by plotting amount ferric iron formed against time of oxidation was substantially horizontal from the period of 8 weeks on, indicating that oxidation had proceeded to the maximum extent to which it would go. It is evident from Fig. 2 that if the iron concentration in the solution exceeds about 15 grams per liter, it cannot be completely oxidized to the ferric form by mere exposure to air; and that if the iron concentration exceeds about 25 grams per liter, the amount of iron that will be oxidized to the ferric form is not sufficient to be useful in leaching operations.

Other facts of significance are also evident from Fig. 2. The charts of this figure demonstrate that at a pH of 2 and at iron concentrations up to about 10 grams per liter, most of the ferric iron formed by oxidation remains in solution (less than 2 grams per liter being precipitated as basic ferric sulphate). At higher iron concentrations, however, a considerably larger amount of basic ferric sulphate precipitates. This has an important bearing on the use of the solution for leaching in place, because any substantial precipitation of basic ferric sulphate during leaching is undesirable on account of the precipitate causing plugging of the solution channels through the ore. For this reason, the solution delivered to the ore should contain not more than 10 grams per liter of iron, and preferably not more than about 8 grams per liter, even though it is possible substantially completely to oxidize the ferrous iron in solutions containing a larger total amount of iron than this. It is possible, and in some cases is desirable, in order to minimize the amount of iron precipitated in the ore column during leaching, to use solutions containing, for example, only 4 grams per liter of iron altogether.

The problem of minimizing the precipitation of basic ferric sulphate in the solution channels through the ore being leached of course does not affect oxidation of used leach solution to condition it for reuse in leaching, and accordingly the effluent solution from the cementation launder may contain a larger total amount of iron (mostly in the ferrous form) than would be desirable in actual leaching. In fact, as pointed out above, the cementation operation introduces an excess of ferrous iron into the solution. If the cementation effluent contains as much as about 15 grams per liter, chart E (Fig. 2) shows that virtually all of this iron will be oxidized to the ferric form, and that the excess over about 10 grams per liter will be precipitated as basic ferric sulphate if a sufficient time for oxidation is allowed. The oxidized solution, containing not much if any more than 10 grams per liter of iron, almost all in the ferric condition, can then be used satisfactorily for leaching. If the solution from the cementation launders contains as much as 25 grams per liter of iron altogether, it can by a sufficiently long exposure to the air be oxidized enough to yield a useful concentration of ferric iron (as shown by chart F, Fig. 2). Accordingly the effluent from the cementation launder may sometimes contain up to 25 grams per liter total iron. Such high iron concentrations are not desirable, however, because the proportion of iron that becomes oxidized is rather small, and the excess ferrous iron at best serves no useful purpose in leaching and at worst may contribute to undesirable plugging of solution channels through the orebody.

Still another factor of significance in leaching in place operations that is apparent from Fig. 2 is the way in which iron concentration in the solution affects the rate at which oxidation to the ferric form takes place. With total iron concentrations up to about 8 grams per liter, most of it (about 75% or more) is oxidized to the ferric form by mere exposure to the air after a period of only three weeks, and after four weeks at a concentration of 10 grams per liter. At higher concentrations, however, a considerably longer time of exposure is required in order to convert most of the ferrous iron to the ferric form. At a concentration of about 15 grams per liter, for example, five to six weeks is required to convert 75% of the ferrous iron to the ferric form, and at still higher concentrations it is impossible to oxidize this proportion of the iron. It is not generally economic to maintain the very large reservoir of solution that is necessary to allow for a prolonged time of oxidation. In many places, especially in arid regions where low-grade porphyry copper orebodies amenable to leaching in place are often found, it may be impractical and uneconomic to have more than three to four weeks' supply of solution on hand. For this additional reason it is undesirable to have more than 15 grams per liter of iron in solution, and it is preferable to keep the iron concentration even in the effluent from the cementation launders at a substantially lower value than this.

Fig. 3 supplements what has been said above in connection with Fig. 2. Fig. 3 shows the relation between the total amount of iron in the solution at the start of oxidation (the pH of the solution having been adjusted to 2.0), and the amount of ferric iron formed after quiescent exposure of the solution to the air for periods of eight and three weeks. It is seen from the two upper curves of this figure that at total iron concentrations up to 10 and even up to 15 grams per liter (initially all present as ferrous sulphate), the amount of iron oxidized to the ferric form in a period of eight weeks closely approaches the maximum possible (indicated by the straight diagonal line marked "Theoretical Ferric Iron Limit"). That is, the efficiency of oxidation is very nearly 100% in a period of eight weeks. At higher concentrations, however, the efficiency of the oxidation drops off sharply, becoming negligible at concentrations of about 30 grams per liter. When the period of quiescent oxidation is three weeks (as shown by the two lower curves of Fig. 3), the sharp decline from near-100% efficiency of oxidation begins to occur at about 8 grams per liter total iron, and is virtually zero at 25 grams per liter. While the longest period of time for which Fig. 3 shows the efficiency of oxidation is but eight weeks, other data has shown that at high iron concentrations (30 grams per liter and more) even periods of oxidation much longer than eight weeks result in negligible oxidation of ferrous iron to ferric.

The data presented in Figs. 2 and 3 are based on effecting oxidation by simple exposure of a quiet body of solution to the air. The rate at which oxidation takes place can be very greatly accelerated by aerating the solution, as by spraying it into the air, or by bubbling air through it. For example, substantially complete oxidation of a solution containing about 8 grams per liter of iron can be brought about in a period of five days by bubbling air continuously through the solution, whereas about seven weeks are required when the solution is simply exposed as a quiescent body to the atmosphere. Such aeration of the solution, however, required large amounts of power in order to treat the large amounts of solution required for a leaching in place operation, and it is ordinarily more economic to provide the larger reservoir of solution needed to permit oxidation to take place by simple exposure of a quiescent body to the air, than to use a smaller volume and gain more rapid oxidation by power-consuming aeration methods. The invention, however, contemplates oxidation of the solution in either manner.

An interesting observation made in connection with tests on the bubbling of air through ferrous iron solutions is that prolonged aeration in this fashion of a solution containing the rather high iron concentration of about 30 grams per liter results in practically no oxidation of the iron in that length of time which is sufficient to effect very considerable oxidation of the iron in a solution containing only 8 grams per liter. This result confirms the showing made above that a low iron concentration, less than 25 grams per liter, is necessary in order for oxidation by air to take place.

What has just been said is indicative of the fact that a low oxidizable iron concentrations the rate of oxidation of a quiescent body depends directly on the area-to-volume ratio of the body during the exposure to the air. For example, the time required for substantially complete oxidation of a solution initially containing 4 grams per liter of ferrous iron at a pH of 2.9, at different ratios of surface-to-volume, is indicated in the following table (the surface-to-volume ratio is determined by dividing the area of the body in units of length squared by its volume in the same units of length cubed):

| Surface-to-Volume Ratio | Time for Substantially Complete Oxidation |
|---|---|
| .55 | 1 Week. |
| .11 | 4 Weeks. |
| .03 | Incomplete at 8 Weeks. |

Accordingly, when oxidation takes place in a quiescent body exposed to the atmosphere, it is desirable for the body to have as large surface-to-volume ratio as is practical. It is most convenient in leaching in place operations to use an open pond as the reservoir for the solution and for exposing it to the oxygen of the air for purposes of oxidation. Such a pond should be as broad in surface area and as shallow as is practical in order to make the volume-to-surface ratio large and so to obtain a high rate of oxidation of ferrous iron to the ferric form.

The temperature of the solution is another factor exerting a considerable influence on the rate at which oxidation proceeds. However, it proceeds rapidly enough at ordinary out-door temperatures so that the solution will oxidize effectively even in an open pond in the winter-time (provided only the pond does not freeze over). At summer temperatures of 70° to 80° F., oxidation is quite rapid, as indicated in Figs. 2 to 4, if the other influencing factors also are properly controlled.

In addition to controlling the concentration of iron in the solution, which has been discussed rather fully above in connection with Figs. 2 and 3, control over the pH of the solution also is of very real importance, as is apparent from a consideration of Fig. 4. Fig. 4 consists of a series of charts H to N showing the effect of varying the pH of a solution containing 4 grams per liter of iron initially substantially all in the ferrous condition. As in Fig. 2, the solid curves of Fig. 4 show the concentration of ferric iron in the several solutions at different periods of time throughout a period of eight weeks during which the solutions were exposed in a quiescent body to the air. The dashed curves show the total amount of ferric iron present both in solution and in the precipitate of basic ferric sulphate that formed. The horizontal straight line at the top of each chart shows the total amount of iron, both ferrous and ferric, present in the solution (4 grams per liter in each case), and is based on the amount introduced into the solution at the start of the test. The vertical distance between the solid curve and the dashed curve on any time ordinate gives the amount of ferric iron precipitated as basic ferric sulphate at that time. The vertical distance between the dashed curve and the horizontal straight line at the top of the chart on any time ordinate shows the amount of ferrous iron then still unoxidized.

Charts H and I of Fig. 2 show that at low pH values (corresponding to fairly high acid concentrations), oxidation proceeds quite rapidly, and that substantially all of the ferric iron remains in solution (none precipitated at a pH of 1.3, and the small amount that precipitated at a pH of 0.8 redissolved). At pH values of 1.75 and above, basic ferric sulphate is precipitated, and the amount precipitated increases with increasing pH. This phenomenon is of importance in two respects. In the first place, it is apparent that too high a pH value must be avoided during the leaching operation itself, or basic ferric sulphate will be precipitated in the ore column and will plug the solution channels through it. On the other hand, too low a pH value must be avoided during oxidation of the ferrous iron to the ferric form, or excess iron not wanted in the leach solution will not be precipitated. A balance of these two opposing factors leads to a determination that a pH of about 2 is optimum for the solution collecting at the bottom of the ore column and carried through the cementation launders to the pond in which oxidation takes place. Exact control of the pH at precisely 2.0 is not essential, but the limits are quite close: the pH should not be much less than 1.75 or more than 2.25 between the point where the solution is collected at the bottom of the orebody and where it is oxidized by exposure to the air in the pond.

Another factor of interest that is apparent from Fig. 2 is that the rate of oxidation decreases somewhat with increasing pH values above about 1.25. From this value up to a pH of about 2 oxidation is virtually completed within three weeks, whereas at a pH of 2.2 about four weeks are required, at a pH of 2.6 five weeks are necessary, and at a pH of 3.3 six weeks are needed. A pH very much above 2 is for this further reason undesirable when the solution is introduced into the pond for oxidation. On the other hand, the pH must not be very much below 2, or as pointed out above, excess ferric iron will not be precipitated.

An interesting observation in connection with the effect of pH on the rate of oxidation has also been made in connection with strong solutions containing 30 grams per liter or more of iron. Some oxidation of a solution containing this much iron does take place at a pH of 2, as shown by chart G of Fig. 2. However, at pH's of 2.5 and 3, solutions of about this same iron concentration are almost completely unoxidized after ten weeks exposure to the air, the total ferric iron present then being less than 2 grams per liter at a pH of 2.5 and only 1.5 grams per liter at a pH of 3. Virtually all of the ferric iron formed at such pH values is found in the precipitated basic ferrous sulphate.

Chart H of Fig. 2, in comparison with charts I and J, indicates that at pH values below about 1.25 the rate at which oxidation of the iron proceeds is less than in the pH range from 1.25 to 2.0. Even at low pH values (below 1.25), however, the rate of oxidation is rapid enough, especially when the solution is warm, so that ferrous sulphate can effectively be oxidized even when the solution is in its most acid condition (directly after adding sulphuric acid from the storage vessel 15 of Fig. 1). This circumstance makes it entirely feasible to by-pass some of the ferrous sulphate effluent from the cementation launder around the pond in which the remainder of this effluent is oxidized, as explained above. The ferrous sulphate in the solution that by-passes the pond is to a large extent oxidized as it seeps down through the ground, even though this solution be quite strongly acidified. Warming of the ground by the exothermic reaction between the sulphuric acid and the oxidized copper minerals has the effect of accelerating such oxidation.

As previously stated, the pH of the solution collected after it has percolated through the orebody should be close to 2, but this does not mean that the pH of the solution as it is delivered to the orebody is nearly so high as this. In fact, it must be lower than 2 to allow for the consumption of acid that takes place in dissolving oxidized copper minerals from the orebody and still avoid having it increase to above 2. The amount of sulphuric acid introduced into the solution just before delivering it to the orebody depends entirely on the depth of the orebody, the amount of oxidized copper minerals and other acid-consuming minerals present therein, etc., and enough acid must be incorporated at the beginning so that the solution collecting at the bottom of the ore column has a pH not lower than about 2. This may require acid concentrations ranging from 3 or 4 grams per liter to 15 or 20, or even more, grams per liter (4 grams per liter $H_2SO_4$ corresponding to a pH of about 1.7, and 20 grams per liter H₂SO₄ corresponds approximately to a pH of 1). Throughout most of the height of the orebody, the solution percolating through it will accordingly have a pH lower than 2. However, toward the bottom of the ore column the pH will approach a value of 2 (due to acid consumption in dissolving oxidized minerals, in oxidizing ferrous sulphate, etc.) and should be neither much higher nor much lower than this value, in order, on the one hand, to insure against precipitation of much basic ferric sulphate in the solution channels in the orebody, and, on the other hand, so that the solution will be in satisfactory condition to enable excess iron to be precipitated when the solution is oxidized (after cementing out the copper) to condition it for reuse in leaching.

From the time the solution is collected at the bottom of the orebody until sulphuric acid is added to it just prior to re-delivering it to the orebody, its pH will not be very different from 2, and Figs. 2 and 3 show that at this pH value some basic ferric sulphate is likely to precipitate almost any place, including inside the pipes, pumps and other apparatus in which the solution is handled. This apparatus, therefore, should be designed so that it can readily be cleaned without interfering seriously with the leaching operations.

I claim:

1. The method of leaching sulphidic copper ore in place which comprises delivering a dilute aqueous solution of sulphuric acid and ferric sulphate to the ore, and collecting the solution after it has passed through the ore, characterized in that the total amount of iron present in the solution delivered to the ore is less than 10 grams per liter and the amount of sulphuric acid therein is such that the pH of the solution as it is collected after passing through the ore is not greater than about 2.

2. The method of leaching sulphidic copper ore in place which comprises delivering a dilute aqueous solution of sulphuric acid and ferric sulphate to the ore, and collecting the solution after it has passed through the ore, characterized in that plugging of the solution channels in the ore by precipitation therein of basic ferric sulphate is prevented by limiting the amount of iron in the solution delivered to the ore to a maximum of about 8 grams per liter and by adding to the solution delivered to the ore sufficient sulphuric acid so that the pH of the solution collected after passing through the ore is about 2.

3. The cyclic method of leaching sulphidic copper ore in place which comprises delivering a dilute aqueous solution of sulphuric acid and ferric sulphate to the ore, collecting the solution after it has passed through the ore, separating copper from the collected solution, thereafter oxidizing the ferrous iron in the solution to the ferric form, and then re-delivering the solution to the ore, characterized in that the total amount of iron in the solution is reduced to less than 10 grams per liter prior to re-delivery of the solution to the ore, and further characterized in that sulphuric acid is added to the solution prior to its re-delivery to the ore in an amount sufficient to impart to the solution when collected after passing through the ore a pH not greater than about 2.

4. The cyclic method of leaching sulphidic copper ore in place which comprises delivering a dilute aqueous solution of sulphuric acid and ferric sulphate to the ore, collecting the solution after it has passed through the ore, separating copper from the collected solution, thereafter oxidizing the ferrous iron in the solution to the ferric form, and then re-delivering the solution to the ore, characterized in that the ferrous iron is oxidized by introducing the solution into a body thereof that is exposed to the oxygen of the air, the total amount of iron in the solution being limited to less than 25 grams per liter at the time of its introduction into said body and the pH of the solution then being not less than about 2, whereby ferric iron in excess of the amount desired in the solution for leaching is caused to precipitate.

5. The method according to claim 4, characterized in that solution is withdrawn from the body and exposed to the oxygen of the air and is re-delivered to the ore only after the total iron concentration therein has been reduced to less than 10 grams per liter.

6. The cyclic method of leaching sulphidic copper ore in place which comprises delivering a dilute aqueous solution of sulphuric acid and ferric sulphate to the ore, collecting the solution after it has passed through the ore, separating copper from the collected solution, thereafter oxidizing the ferrous iron in the solution to the ferric form, and then re-delivering the solution to the ore, characterized in that the ferrous iron is oxidized by introducing the solution into a shallow pond of large surface area relative to its volume, the total amount of iron in the solution being limited to less than 15 grams per liter at the time of its introduction into said pond and the pH of the solution then being about 2, whereby ferric iron in excess of the amount desired in the solution for leaching is caused to precipitate, and withdrawing solution containing less than about 8 grams per liter of iron, substantially all of which is in solution in the ferric form, from said pond, and delivering such withdrawn solution to the ore.

7. In a cyclic method for leaching sulphidic copper ore in place, involving delivering a dilute solution of sulphuric acid and ferric sulphate to the ore and collecting the solution after it has passed through the ore, the steps which comprise cementing copper from the collected solution with metallic iron, whereby ferrous sulphate is introduced into the solution, withdrawing the solution from the cementation operation at a pH not less than about 2 and while the total amount of iron it contains is less than 15 grams per liter, exposing the withdrawn solution to the oxygen of the air for a sufficient period of time to oxidize the ferrous sulphate therein to ferric sulphate and to precipitate sufficient iron to reduce the total amount thereof in solution to less than 10 grams per liter, and utilizing the resulting oxidized solution in further leaching of the ore.

8. In a cyclic method for leaching sulphidic copper ore in place, involving delivering a dilute solution of sulphuric acid and ferric sulphate to the ore and collecting the solution after it has passed through the ore, the steps which comprise cementing copper from the collected solution with metallic iron, whereby ferrous sulphate is introduced into the solution, withdrawing the solution from the cementation operation at a pH not less than about 2 and while the total amount of iron it contains is less than 15 grams per liter, introducing the thus-withdrawn solution into a pond of large surface area relative to its volume, wherein the solution is exposed to the oxygen of the air and its ferrous iron content is oxidized to the ferric form and excess iron is precipitated from solution, and withdrawing solution containing less than 10 grams per liter of iron from said pond for use in further leaching of the ore.

9. In a process of the character described, involving treating a solution containing ferrous iron to oxidize the iron to the ferric form and to precipitate excess iron from the solution, the improvement which comprises introducing the solution into a container, exposing the solution in the container to the oxygen of the air, and keeping it thus exposed for a period of at least several days, characterized in that the solution contains less than 25 grams per liter of iron and is acidified with sulphuric acid to a pH not less than about 2 at the time of its introduction into said container, whereby a large part of the iron is oxidized to the ferric form and a part of the ferric iron is precipitated.

10. In a process of the character described, involving treating a solution containing ferrous sulphate to oxidize the iron to the ferric form and to precipitate excess iron from the solution, the improvement which comprises introducing the solution while it contains less than 15 grams per liter of iron and is acidified with sulphuric acid to a pH of about 2 into a pond having a large surface area relative to its volume, and exposing the solution in the pond to the air for a period of several weeks, whereby substantially all of the iron is oxidized to the ferric form and the amount of iron in solution is reduced by precipitation of basic ferric sulphate to less than about 10 grams per liter.

11. The cyclic method of leaching sulphidic copper ore in place which comprises delivering a dilute aqueous solution of sulphuric acid, ferrous sulphate and ferric sulphate to the ore, collecting the solution after it has passed through the ore, cementing copper from the collected solution, delivering a portion of the solution containing iron mostly in the form of ferrous sulphate from the cementation operation to a pond wherein it is exposed to the air, the cementation of iron in such solution being less than 15 grams per liter and the pH of the solution being about 2, whereby the ferrous iron in the solution is oxidized to the ferric form, withdrawing solution containing ferric sulphate from the pond and mixing it with the remaining portion of solution containing ferrous sulphate from the cementation launder, adding sulphuric acid to said mixed solutions, and re-delivering the mixed solutions to the ore, the amount of sulphuric acid added to the mixed solutions being sufficient so that the pH thereof after draining through the ore is not greater than about 2.

WALTER GIFFORD SCOTT.

REFERENCES CITED

The following references are of record in the file of this patent:

UNITED STATES PATENTS

| Number | Name | Date |
| --- | --- | --- |
| 1,021,768 | Gahl | Apr. 2, 1912 |
| 1,451,734 | Irving | Apr. 17, 1923 |
| 1,837,286 | Oppenheim | Dec. 22, 1931 |

OTHER REFERENCES

"Comprehensive Treatise on Inorganic and Theoretical Chemistry," vol. 14, published by Longmans, Green & Co., 1935, page 303.

"Metallurgy of Copper," by Newton and Wilson, published by John Wiley and Sons, 1942, pages 327, 336, 337, and 359.

U. S. Bureau of Mines Report of Investigations #3228, May 1934, page 23.

U. S. Bureau of Mines Bulletin #321, 1930, page 60.